W. H. HENDERSON.
POWER OPERATED HANDSAW.
APPLICATION FILED JUNE 30, 1909.
976,801.
Patented Nov. 22, 1910.
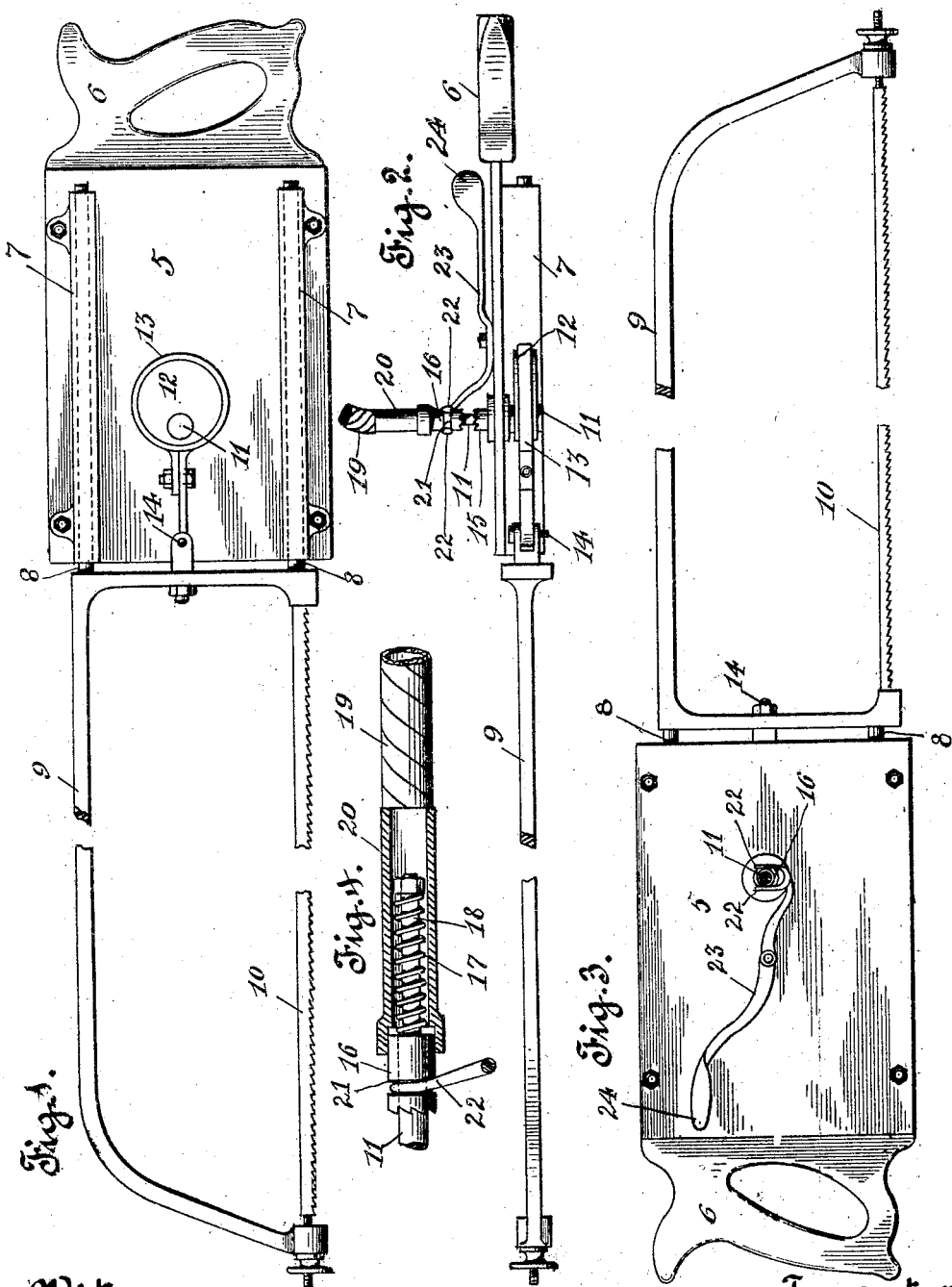
Witnesses,
Inventor,
William H. Henderson
by Hazard & Strauss
Attorneys.

UNITED STATES PATENT OFFICE.

WILLIAM H. HENDERSON, OF LOS ANGELES, CALIFORNIA, ASSIGNOR OF ONE-HALF TO ANNA CARPENTER, OF LOS ANGELES, CALIFORNIA.

POWER-OPERATED HANDSAW.

976,801.

Specification of Letters Patent.  Patented Nov. 22, 1910.

Application filed June 30, 1909. Serial No. 505,152.

*To all whom it may concern:*

Be it known that I, WILLIAM H. HENDERSON, a citizen of the United States, residing at Los Angeles, in the county of Los Angeles and State of California, have invented new and useful Improvements in Power-Operated Handsaws, of which the following is a specification.

This invention relates to a hand saw especially adapted for surgical and butchers' use, and the prime object thereof is to provide a saw which will quickly perform the cutting of bones without fracturing or splintering them.

The saw consists broadly of a relatively stationary part provided with a handle which is held from movement by the hand of the operator. The saw frame is mounted on this stationary part and power means are applied to rapidly reciprocate the saw. This extremely rapid reciprocation admits of the use of a saw blade with very fine or practically no teeth, and the cut made is therefore extremely smooth without any liability of the saw fracturing or splintering the bone.

In the accompanying drawings forming a part of this specification:—Figure 1 is a side elevation of my improved saw. Fig. 2 is a plan view of the same. Fig. 3 is a reverse side elevation of the same. Fig. 4 is an enlarged detail of a portion of the power connecting clutch.

In the drawings, 5 designates the body portion of a stationary frame which may be constructed of sheet metal, preferably aluminum, as this metal affords a sufficient strength with a desirable lightness. Secured in any suitable manner to one end of plate 5 is a saw handle 6 of usual configuration. Mounted on one side of plate 5 is a pair of guides 7 having ways therein for the reception of reciprocating rods 8 carrying on their outer ends saw frame 9. Saw blade 10 is mounted in the saw frame in the usual manner.

Suitably journaled on plate 5 and passing therethrough is a shaft 11 which carries on its ends on the side of plate 5 adjacent guides 7, an eccentric 12 encircled by an eccentric strap 13 which is pivotally connected at 14 to saw frame 9. On the other side of plate 5 a ratchet clutch member 15 is rigidly mounted on shaft 11 and a corresponding sliding member 16 is adapted to be worked into engagement with member 15 by means of a coiled spring 17 mounted around the reduced portion 18 of shaft 11. Flexible shaft 19 from any suitable source of power, as a small electric motor, is provided with a terminal sleeve 20 which fits over the reduced portion 18 of shaft 11, and spring 17 is screwed into the end of movable member 16 of the clutch. Member 16 is provided with a groove 21 in which fingers 22 formed on the ends of pivoted clutch operating lever 23 are adapted to ride. Lever 23 is provided with a thumb piece 24, so that it may be manipulated conveniently by the hand upon handle 6 and fingers 22 are arranged at an angle to the vertical, as shown in Fig. 4, so that upon the downward movement of thumb piece 24 and the upward movement of the fingers, clutch member 16 is forced downwardly and out of engagement with member 15. When it is desired that the saw be operated, thumb-piece 24 is pressed upwardly and spring 17 forces clutch member 16 into engagement with member 15.

This saw is especially adapted to be operated by a small motor which runs at a high speed, giving the saw blade up to two thousand reciprocations per minute or thereabout. On account of this high traveling speed of the saw, the teeth thereof may be made extremely fine and the saw will still cut very rapidly. For cases where an especially smooth cut is desirable, a plain blade of steel without any teeth whatever, but with square edges, is used in place of the usual saw blade, a small roughness of the hard steel sufficing to cut the bone at the high cutting speed at which the blade is operated. Further, when a toothed saw is used, the set of the teeth is very slight, if any at all, as it is intended that the side surfaces of the blade shall rub against the surfaces just cut by the teeth and render them smooth.

This saw may be made in different sizes, weights and configurations to suit the requirements of several different operations to be performed. The saw for butchers' use is about the same size and weight of the saw now ordinarily in use, while the saw as designed for surgeons' use will be much smaller and lighter.

Having described my invention what I claim as new and desire to secure by Letters Patent is:—

1. A power operated hand saw, comprising a handle, a body portion attached to said handle, parallel guide-ways carried by said body portion, an eccentrically mounted driving means located between said parallel guideways, means for transmitting power to said driving means, a clutch between said transmission means and said driving means, a lever coöperating with said clutch carried by said body portion and terminating in a thumb piece adjacent said handle, a saw frame having means thereon to coöperate with said guideways, and means connecting said saw frame with said driving gear.

2. A hand controlled power tool, comprising a handle, a body portion attached to said handle, guideways on said body portion, a saw frame, means connected to said saw frame and coöperating with said guideways, means to transmit power to said body portion, and driving means located on said body portion between said guideways.

In witness that I claim the foregoing I have hereunto subscribed my name this 22nd day of June, 1909.

W. H. HENDERSON.

Witnesses:
EDMUND A. STRAUSE,
MYRTLE A. PALMER.